United States Patent [19]
Appel et al.

[11] 3,802,733
[45] Apr. 9, 1974

[54] MOTOR VEHICLE

[75] Inventors: Hermann Appel, Wolfsburg; Ernst Fiala, Braunschweig-Querum, both of Germany

[73] Assignee: Volkswagenwerk Aktiengesellschaft, Wolfsburg, Germany

[22] Filed: May 15, 1972

[21] Appl. No.: 253,493

[30] Foreign Application Priority Data
May 29, 1971 Germany............................ 2126937

[52] U.S. Cl.................................. 296/28 R, 293/62
[51] Int. Cl................................................ B62d 31/00
[58] Field of Search............... 296/28 R, 31 R, 31 P; 293/62

[56] References Cited
UNITED STATES PATENTS
| | | | |
|---|---|---|---|
| 3,219,384 | 11/1965 | Graham | 296/28 R |
| 3,098,675 | 7/1963 | Gerin | 296/28 R |
| 3,363,934 | 1/1968 | Peters | 296/28 R |
| 3,663,034 | 5/1972 | Barenyi | 296/28 R X |

FOREIGN PATENTS OR APPLICATIONS
854,157 10/1952 Germany............................ 296/28 R

*Primary Examiner*—David Schonberg
*Assistant Examiner*—John A. Pekar
*Attorney, Agent, or Firm*—Brumbaugh, Graves, Donahue & Raymond

[57] ABSTRACT

A vehicle having a chassis and a body formed as a unitary structure comprises two longitudinally spaced apart end portions and an intermediate passenger space. The impact resistance of the structure is greatest about the passenger space and diminishes to predetermined minimum values in both longitudinal and lateral directions. The minimum value of the impact resistance in the lateral directions is greater than the minimum value of the resistance in the longitudinal directions. The vehicle is encircled by a rigid zone which distributes the impact energy of a collision, thereby cooperating with the progressively diminishing impact resistances of the various portions of the unitary structure to cause deflection of low resistance areas of the unit, relatively distant from the point of impact, in preference to high resistance areas, relatively near the point of impact.

3 Claims, 3 Drawing Figures

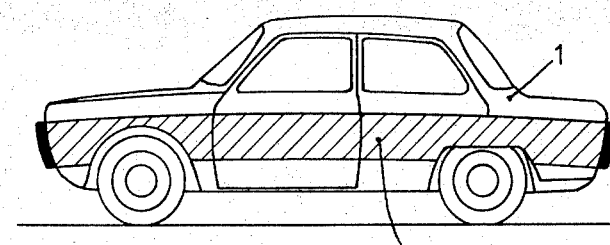
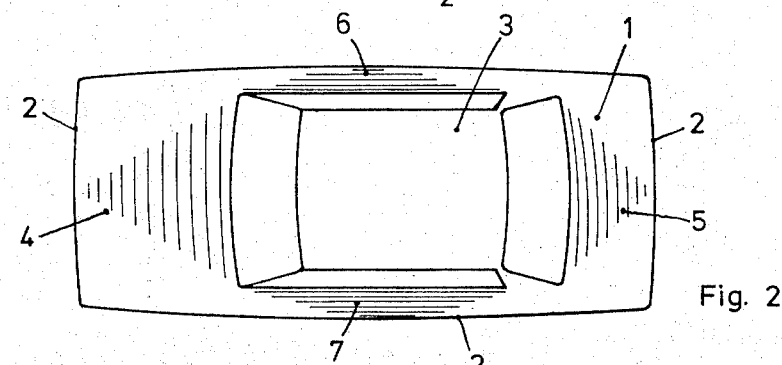
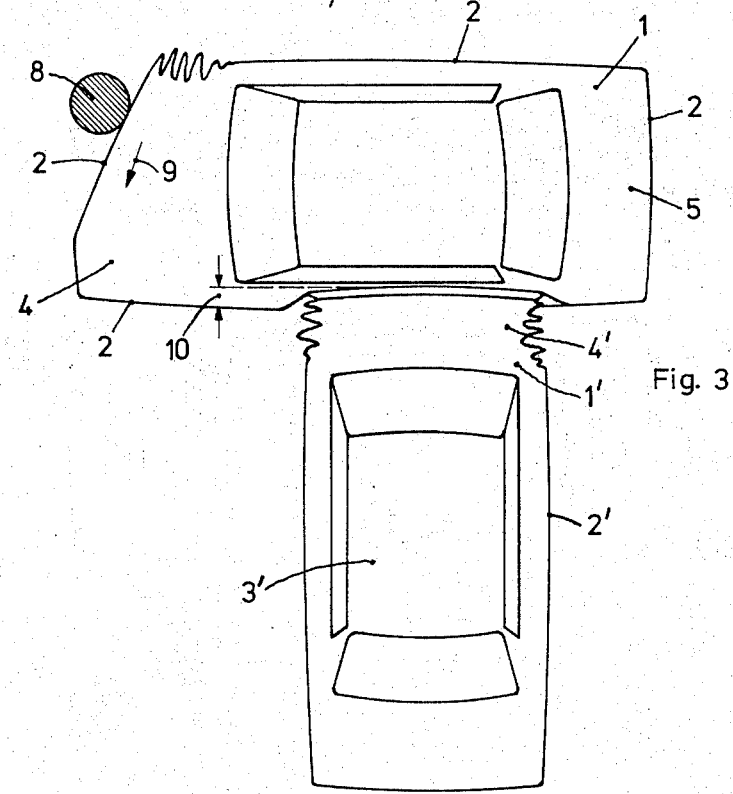

MOTOR VEHICLE

BACKGROUND OF THE INVENTION

The steady rise in motor vehicle traffic over the past few decades and the resultant increase in motor vehicle accidents has led to public concern and government action to increase the safety of motor vehicle travel. One aspect of the effort is increasing the safety of the vehicles themselves. To this end many new devices have been proposed for use in motor vehicles. Some, such as safety belts and "dished" steering wheels, are now in widespread use and are, in fact, required by law. Others, such as air bags which expand rapidly upon the impact of a collision, are being developed and proposed as required equipment.

A different approach is illustrated by a German Pat., No. 854,157, which discloses the dimensioning and designing of the chassis and body of a motor vehicle such that the resistance of the vehicle is largest within the area of the passenger space and diminishes continuously or by steps toward the outer ends. In the lateral directions, the resistance within the area of the passenger space is constant or increases. A vehicle manufactured according to the teaching of the patent can absorb much of the energy resulting from an end-to-end collision. Upon impact, the end portion of the vehicle crumples, thereby dissipating energy which would otherwise be transmitted to the passenger space with attendant injury to its occupants.

Vehicles manufactured according to the abovenoted patent will no doubt provide greater safety for their occupants in the event of a end-on collision with an object having a rather broad contact surface. However, the constant or increasing rigidity of such a vehicle in the lateral directions from the passenger space causes a substantial portion of the energy from a sideways collision to be transmitted to the passenger space and its occupants. Also, in the event of a collision with a tree or other object having a relatively small contact surface, the force of the collision is applied to a relatively small area of the vehicle, substantially reducing the effectiveness of the outwardly diminishing resistance of the vehicle structure. The tree acts as a knife, cutting through the vehicle structure to the passenger space.

SUMMARY OF THE INVENTION

The present invention is a new and unique vehicle which will further increase the safety of its occupants. The vehicle has a chassis and a body formed as a unitary structure comprising longitudinally spaced-apart end portions and an intermediate passenger space. The impact resistance of the unit is greatest about the passenger space and diminishes to predetermined minimum values in both longitudinal and lateral directions. The resistance diminishes either continuously or in steps and the minimum value of the resistance in the lateral directions is preferably greater than the minimum value of the resistance in the longitudinal directions. Thus, in a collision between two vehicles manufactured with the preferred minimum impact resistance values in which one vehicle rams the side of the other, the end portion of the ramming vehicle absorbs a greater portion of the energy from the collision and is deflected to a greater extent. Given the considerably greater longitudinal dimensions, relative to lateral dimensions, of most presently manufactured cars, the preferred impact resistances maximize the safety of the occupants of both vehicles.

An additional feature of this vehicle is a rigid peripheral zone encircling the unitary structure and arranged such that in a collision it is generally the first portion of the vehicle to contact other objects. It may be provided by any convenient means and may be integral with the body or chassis. The zone is adapted to distribute the impact energy of a collision, thereby cooperating with the diminishing impact resistances of the various portions of the unit to cause the deflection of low resistance areas of the structure, relatively distant from the point of impact, in preference to high resistance areas, relatively near the point of impact. In a collision with a tree or similar object, the rigid peripheral zone reduces the knife-like action of the tree, distributing the impact energy over a relatively large area of the vehicle to take better advantage of its progressively diminishing impact resistances.

The ultimate benefit from this invention would be gained by the uniform construction of all motor vehicles and by a precisely defined gradation of the impact resistances in proportion to the weight of the individual vehicles. This would make it possible to select appropriate resistances to insure the safety of the occupants of even the smallest vehicles.

DESCRIPTION OF THE DRAWINGS

For better understanding of the invention reference may be had to the following description of an exemplary embodiment, taken in conjunction with the figures of the accompanying drawings in which:

FIG. 1 is a side view of a vehicle according to the invention, showing the rigid peripheral zone encircling the vehicle;

FIG. 2 is a plan view of the vehicle, schematically showing the progression of the resistance; and FIG. 3 is a plan view of two vehicles involved in a collision showing the relative deformations of the vehicles.

DESCRIPTION OF THE INVENTION

A vehicle, generally designated 1, has a chassis and a body formed as a unitary structure. As shown in FIG. 2, the unit comprises end portions 4 and 5, side portions 6 and 7, and a passenger space 3 located intermediate the end portions 4 and 5 and the side portions 6 and 7. The impact resistance of the unit is greatest about the passenger space 3 and diminishes to predetermined minimum values in both longitudinal and lateral directions, as schematically indicated. Preferably, the minimum value of the impact resistance of the side portions 6 and 7 is greater than the minimum value of the resistance of the end portions 4 and 5. The beneficial result of the preferred differential between the minimum values of the impact resistances is shown in FIG. 3, which depicts a collision in which one vehicle has rammed the side of another. The end portion 4' of vehicle 1' has absorbed the major portion of the shock of impact and is substantially deformed. On the other hand, the side portion 7 of vehicle 1 has only been deflected a relatively small distance 10, reflecting its relatively higher minimum resistance. The relatively small deflection of side portion 7 is consistent with the relatively shorter distance that side portion 7 can be deflected without injury to the occupants of vehicle 1.

An additional feature of the invention, as shown in FIG. 1, is a rigid peripheral zone 2 encircling the vehicle and arranged such that in a collision it is generally the first portion of the unitary structure to contact other objects. The rigid peripheral zone may, for example, be a separate bumper attached to the vehicle or a fender integrally formed in the unit consisting of the body and chassis. The zone 2 is adapted to distribute the impact energy of a collision over a greater area of the unit than would otherwise be the case. Thus, it cooperates with the diminishing impact resistances of the various portions of the unitary structure to cause the deflection of low resistance areas of the unit, located relatively distant from the point of impact, in preference to high resistance areas of the unit located relatively near to the point of impact. To illustrate, FIG. 3 depicts a vehicle 1 in a collision with a tree, or similar structure, 8 causing a deflection of the front portion 4 of the vehicle. The rigid peripheral zone 2 produces a deflection component in the direction of the arrow 9, causing a distribution of the deflection over a relatively large area of the low impact resistance front portion 4 of the vehicle 1. Some of the impact energy is absorbed across the front of the vehicle, rather than being transmitted longitudinally through the vehicle toward the passenger space. Thus, the rigid peripheral zone permits a greater utilization of the energy absorbing qualities of the progressively diminishing resistance of the vehicle structure.

It will be understood that the above-described embodiment is merely exemplary and that those skilled in the art may make many variations and modifications without departing from the spirit and scope of the invention. All such modifications and variations are intended to be within the scope of the invention as defined in the appended claims.

We claim:

1. A vehicle having a chassis and a body formed as a unitary structure comprising two longitudinally spaced-apart end portions, two laterally spaced-apart side portions, and a passenger space located intermediate said end portions and said side portions, the impact resistance of each of said end portions being greatest in a zone thereof adjacent the passenger space and diminishing through further successive zones thereof to a predetermined minimum value in a longitudinally outermost zone thereof, the impact resistance of each of said side portions being greatest in a zone thereof adjacent the passenger space and diminishing through further successive zones thereof to a predetermined minimum value in a laterally outermost zone thereof, the minimum values of impact resistance in the laterally outermost zones of said side portions being greater than the minimum values of impact resistance in the longitudinally outermost zones of said end portions.

2. A vehicle according to claim 1, further comprising a rigid peripheral zone encircling the said unitary structure, said zone arranged such that in a collision it is generally the first portion of the said unit to contact other objects and is adapted to distribute the impact energy of a collision, thereby cooperating with the diminishing impact resistances of the various portions of the unitary structure to cause the deflection of low resistance zones of the unitary structure located relatively distant from the point of impact in preference to high resistance zones of the unit located relatively near to the point of impact.

3. A system of vehicles comprising at least two vehicles, each vehicle having a chassis and a body formed as a unitary structure comprising two longitudinally spaced-apart end portions, two laterally spaced-apart side portions, and a passenger space located intermediate said end portions and said side portions, the impact resistance of each of said end portions being greatest in a zone thereof adjacent the passenger space and diminishing through further successive zones thereof to a predetermined minimum value in a longitudinally outermost zone thereof, the impact resistance of each of said side portions being greatest in a zone thereof adjacent the passenger space and diminishing through further successive zones thereof to a predetermined minimum value in a laterally outermost zone thereof, the minimum values of impact resistance in the laterally outermost zones of said side portions being greater than the minimum values of impact resistance in the longitudinally outermost zones of said end portions, the minimum values of impact resistance in the laterally outermost zones of said side portions of each vehicle further being greater than the minimum values of impact resistance in the longitudinally outermost zones of the end portions of every other vehicle in the system and the minimum values of impact resistance in the longitudinally outermost zones of said end portions of each vehicle further being less than the minimum values of impact resistance in the laterally outermost zones of the side portions of said every other vehicle.

* * * * *